United States Patent [19]

Yoshioka et al.

[11] 4,339,490

[45] Jul. 13, 1982

[54] FIBER REINFORCED PLASTIC SHEET MOLDING COMPOUND

[75] Inventors: Naonori Yoshioka, Hiroshima; Hisashi Tada; Setsuo Kashiyama, both of Otake, all of Japan

[73] Assignee: Mitsubishi Rayon Company, Limited, Tokyo, Japan

[21] Appl. No.: 183,278

[22] Filed: Sep. 2, 1980

[30] Foreign Application Priority Data

Sep. 12, 1979 [JP] Japan .................................. 54/117089

[51] Int. Cl.³ .................. B32B 7/00; B32B 9/04; B32B 27/14
[52] U.S. Cl. .................................... 428/213; 428/302; 428/303; 428/327; 428/339; 428/413; 428/417
[58] Field of Search ............... 428/213, 288, 297, 302, 428/325, 327, 474, 480, 417, 367, 368, 339; 525/12

[56] References Cited

U.S. PATENT DOCUMENTS

| | | | |
|---|---|---|---|
| 3,245,865 | 4/1966 | Hawkins et al. | 428/417 |
| 3,582,388 | 6/1971 | Staynen | 428/325 |
| 3,920,879 | 11/1975 | Segal et al. | 428/474 |
| 4,025,686 | 5/1977 | Zion | 428/310 |
| 4,029,841 | 6/1977 | Schmidt | 428/325 |
| 4,098,943 | 7/1978 | Degginger et al. | 428/283 |
| 4,141,929 | 2/1979 | Stoops et al. | 525/12 |
| 4,154,888 | 5/1979 | Dewey | 428/215 |
| 4,201,612 | 5/1980 | Figge et al. | 156/244 |
| 4,255,219 | 3/1981 | Dellavecchia | 156/243 |

FOREIGN PATENT DOCUMENTS 51-65187  6/1976  Japan .

Primary Examiner—P. E. Willis, Jr.
Attorney, Agent, or Firm—Oblon, Fisher, Spivak, McClelland & Maier

[57] ABSTRACT

A fiber-reinforced plastic sheet molding compound comprising a sheet member (A) formed of a resin composition which consists of 30 to 90% by weight of a reinforcing cut fiber and 70 to 10% by weight of a matrix resin, at least one surface of said sheet member (A) being intimately applied to a sheet member (B) which is formed of the matrix resin and which has a thickness thinner than that of sheet member (A).

9 Claims, 7 Drawing Figures

FIBER REINFORCED PLASTIC SHEET MOLDING COMPOUND

BACKGROUND OF THE INVENTION

1. Field of the Invention

The present invention relates to a sheet molding compound which is useful for the production of fiber-reinforced plastic molded articles by the compression molding process or the like, and to a process for preparing the same.

According to the sheet molding compound of the present invention, the resin compound exhibits good flowability during the step of molding, and the reinforcing fiber uniformly flows in the same direction along the plane of the sheet. Therefore, the fiber-reinforced plastic molded articles prepared by using the sheet molding compound of the present invention contain the reinforcing fibers at a uniform density to exhibit uniform strength, and exhibit very good appearance without permitting the reinforcing fiber to protrude on the surfaces of the molded articles.

Accordingly, the sheet molding compound of the present invention can be effectively used for producing fiber-reinforced plastic molded products such as fishing reels, electronics apparatus container, bracket, brake cover, gears and automobile parts, which require precision, uniform strength and good appearance.

2. Description of the Prior Art

A variety of molded products which had hitherto been made of metals, such as bath tubs, water tanks, automobile parts and the like, have now been made of a resin compound consisting of reinforcing fibers such as cut fibers or glass fibers and matrix resins, and it is considered that this tendency will further grow in the future. Fiber-reinforced plastic molded products are produced by the cast molding process, transfer molding process, matched-die molding process, and compression molding process. The resin compounds must exhibit good flowability during the molding by the above-mentioned processes and, therefore, are not allowed to contain reinforcing fibers in large amounts, from which it is difficult to produce molded products having increased strength. Particularly, the molded products have markedly decreased density of reinforcing fibers at the corner portions which accounts for the reduced strength at the corner portions as compared with other portions. Further, the reinforcing cut fibers in the resin compound undergo the three-dimensional flow during the step of molding; cut fibers float on the surfaces of the fiber-reinforced plastic molded products made of the resin compound to deteriorate the appearance. In the conventional art, therefore, it was necessary to beautifully finish the surfaces of the molded products.

The U.S. Pat. No. 4,141,929 discloses a new dry, hardenable, thickened, resinous sheet molding composition containing axially aligned continuous filaments, which can be molded by the matched-die molding process. This sheet molding compound contains unidirectionally aligned reinforcing fibers and is effective for producing fiber-reinforced plastic molded products of elongated shapes such as fishing rods and pole vault poles, but is not suited for producing fiber-reinforced plastic molded products having very complicated shapes such as spinning reels, electronics apparatus container, bracket, brake cover, or gears.

SUMMARY OF THE INVENTION

The object of the present invention is to provide a new and useful dry, thickened resinous sheet molding compound containing large amounts of reinforcing fibers which can be molded by various molding methods such as cast molding, transfer molding, matched-die molding and compression molding, to produce molded products containing uniformly distributed reinforcing fibers and maintaining good appearance.

DESCRIPTION OF THE INVENTION

Figure 1:
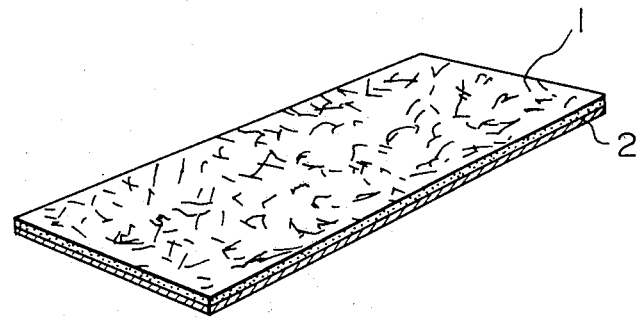
FIGS. 1 and 2 are perspective views illustrating a sheet molding compound of the present invention.

The present invention relates to a fiber reinforced plastic sheet molding compound which is obtained by laminating a resin sheet of the same type as a matrix resin on at least one surface of a sheet-like material consisting of 30 to 90% by weight of a reinforcing cut fiber which is oriented in the same direction along the plane of the sheet and 70 to 10% by weight of the matrix resin.

Fiber-reinforced plastic sheet molding compounds have been used in wide field of applications owing to their easily handling property. Products prepared by using the fiber-reinforced sheet molding compound by the heat compression moldings process have such defects that cut fibers appear on the surfaces of the molded product to deteriorate the appearance and that the strength becomes locally small. These defects appear more conspicuously as the molded products are produced in more complex shapes.

Techniques have heretofore been developed to eliminate such defects. First, there has been proposed a method of varying the amount of cut fibers that are added to the sheet molding compound. To eliminate the above defects by this method, however, the amount of cut fibers must be decreased, which, however, makes it difficult to obtain a desired sheet molding compound. A second method consists of adding an additive to enhance the flowability of the sheet molding compound during the step of molding. The molded products obtained by this method exhibit good appearance but insufficient strength.

The present invention deals with a fiber-reinforced plastic sheet molding compound which satisfies the above-mentioned requirements, and particularly deals with a sheet molding compound comprising a sheet (I) of a resin compound composed of 30 to 90% by weight of a reinforcing fiber and 70 to 10% by weight of a matrix resin, and a sheet (II) of a compound consisting of 70 to 100% by weight of the matrix resin and, as required, less than 30% by weight of a filter, the sheet (II) having a thickness smaller than that of the sheet (I) and being intimately applied to at least one surface of the sheet (I).

The sheet (I) which is used for preparing the fiber-reinforced plastic sheet molding compound of the present invention, is obtained by the methods which are mentioned below.

A first method consists of molding a resin composition consisting of a cut fiber of a length of 1 mm or greater and a matrix resin into a sheet. A second method consists of scattering a cut fiber of a length of greater than 1 mm onto a sheet composed of a matrix resin, and integrally molding them together under the pressure. According to a third method, a nonwoven fabric composed of a reinforcing fiber of a length of greater than 1 mm is impregnated with a matrix resin to prepare a sheet, or a sheet composed of a reinforcing fiber which is oriented in one direction is impregnated with a matrix resin, and the thus prepared sheet is cut into small pieces of a width of greater than 1 mm and a length of greater than 3 mm, and the pieces are laminated in a random fashion to produce a sheet-like product. A fourth method consists of impregnating a reinforcing fiber tow with a matrix resin, molding the tow into a tape of a width of more than 1 mm, cutting the tape into pieces of a length of greater than about 3 mm, and laminating the pieces to produce a sheet-like product.

Representative examples of the reinforcing fiber used for preparing the sheet (I) include organic fibers such as polyester fibers, polyamide fibers, aromatic polyamide fibers and polyamideimide fibers, and inorganic fibers such as glass fibers, silicon carbide fibers, alumina fibers, titanium fibers, steel fibers, carbon fibers and graphite fibers.

The reinforcing fibers may have any lengths, but should be within a range of greater than 1 mm but smaller than 100 mm, so that the sheet molding compound of the present invention will exhibit good moldability and the molded products composed of the sheet molding compound will exhibit improved mechanical properties.

Figure 2:
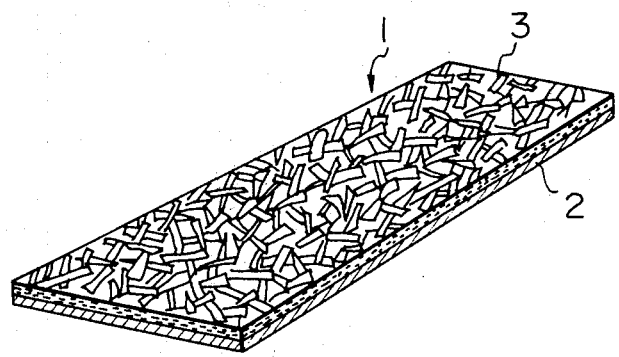

FIG. 2 schematically illustrates, on an enlarged scale, the fiber-reinforced plastic sheet molding compound of the present invention prepared by using the sheet (I) that is obtained by laminating elongated pieces in a random fashion, the elongated pieces being composed of a reinforcing fiber produced by the above-mentioned third method or the fourth method and the matrix resin. With the sheet molding compound of the present invention, the elongated reinforcing pieces as denoted by 3 in FIG. 2 uniformly flow along the plane of the sheet during the step of molding up to the corners in the metal mold. Using the sheet molding compound of the present invention, therefore, density of the reinforcing fibers does not become small in the corner portions of the molded products unlike the plastic molded products composed of the conventional sheet molding compounds. Further, the small elongated pieces flow in the second dimensional directions along the plane of the sheet, and do not flow in a direction perpendicular to the plane of the sheet. Therefore, the reinforcing fibers do not appear on the surfaces of the molded product and do not deteriorate the appearance. Further, the elongated pieces containing even large amounts of the reinforcing fibers are capable of easily flowing in the sheet molding compound maintaining their own shape in the step of molding. Accordingly, it is possible to provide the sheet molding compound which is capable of forming the molded products having very large strength without deteriorating the moldability of reinforcing fibers in the sheet molding compound.

The elongated pieces containing the reinforcing fibers may be formed not only in an oblong shape, but may be formed in a triangular shape, in a circular shape, in an oval shape or in a polygonal shape. So that the pieces can be easily prepared, however, they should have a width of from 1 to 50 mm and a length of from about 3 to about 100 mm.

Figure 3:
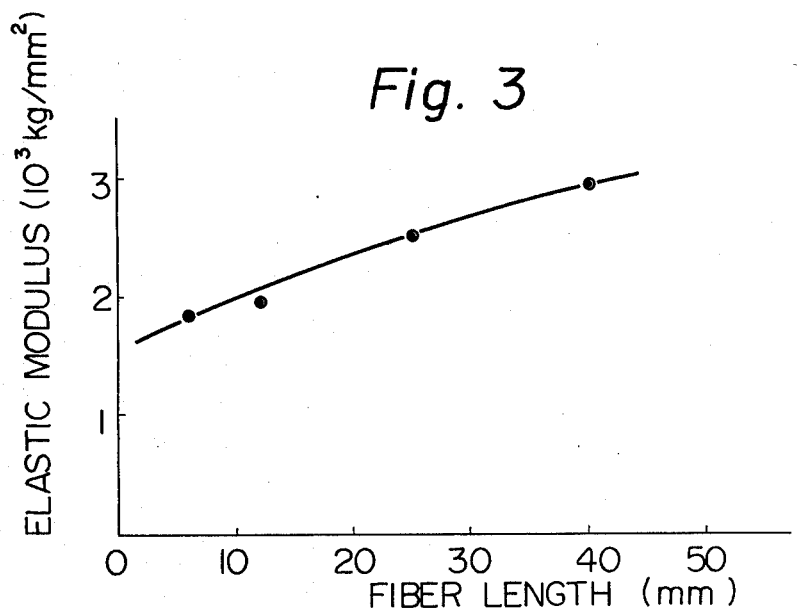
FIG. 3 is a diagram illustrating a relation between the bending modulus of elasticity and the average length of reinforcing fibers of a molded product prepared by using the sheet molding compound of the present invention.
Figure 4:
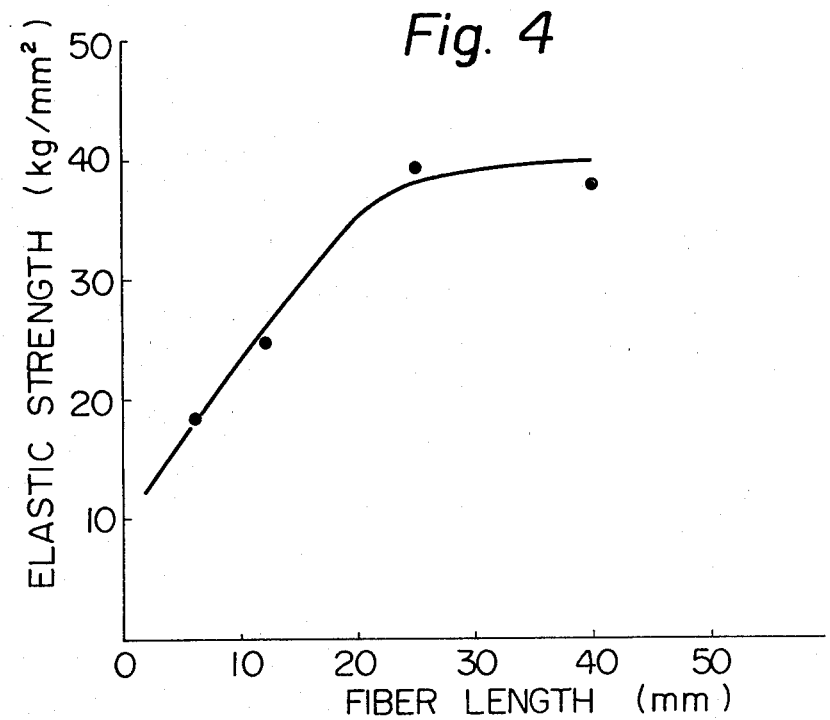
FIG. 4 is a diagram illustrating a relation between the bending strength and the average length of reinforcing fibers of a molded product prepared by using the sheet molding compound of the present invention.

FIGS. 3 and 4 illustrate relations in mechanical characteristics between the length of the reinforcing fiber and the molded product. Namely, FIG. 3 illustrates the relation between the length of the fiber and the bending modulus of elasticity, and FIG. 4 illustrates the relation between the length of the fiber and the bending strength. These data are based upon the average values of a three-point bending test that was conducted by preparing a box-like molded product using a carbon fiber as a reinforcing fiber and an epoxy resin as a matrix, and by taking out specimens for bending test from the bottom and side surfaces of the molded product.

The content of the reinforcing fiber which constitutes the sheet (I) must lie within a range of from 30 to 90% by weight. When the content of the reinforcing fiber is smaller than 30% by weight, the fiber-reinforced sheet molding compound makes it difficult to obtain fiber-reinforced plastic molded products having increased strength. When the content of the reinforcing fiber is greater than 90% by weight, on the other hand, the fiber-reinforced sheet molding compound loses the moldability to a striking degree.

Examples of the matrix resin employed for preparing the sheet (I) include thermosetting resin, unsaturated polyester resin, diallyl phthalate resin, epoxy resin, phenol resin, and the products thereof of the B-stage, and thermoplastic resin such as polyamide, polyester, polybutylene terephthalate, polysulfone, polyether sulfone, polycarbonate, ABS, and the like. From the standpoint of handling, however, the matrix resin should be capable of forming a film-like product at normal temperature.

The sheet molding compound consisting of the sheet (I) only lacks the flowability during the step of heating, and makes it difficult to obtain plastic molded products maintaining high molding precision.

According to the present invention, the sheet (II) made of a resin composition containing reinforcing fibers and fillers in amounts smaller than 30% by weight and having a thickness smaller than that of the sheet (I), is stuck to at least one surface of the sheet (I), thereby to strikingly increase the flowability of the reinforcing fibers in the sheet (I) during the step of molding.

The amount of the additives contained in the sheet (II) should be smaller than 30% by weight. The sheet prepared from a matrix resin composition containing additives in amounts in excess of 30% by weight, decreases the flowability when it is being heated. Additives contained in the sheet (II) may be of a variety of forms such as granular form, stranded form, a form of cut fiber, and the like.

The sheet (II) should have a thickness smaller than that of the sheet (I). With the sheet molding compound having the sheet (II) of a large thickness, the reinforcing fibers in the sheet (I) do not uniformly flow into every area of the metal mold, which makes it difficult to produce fiber reinforced plastic molded products containing the reinforcing fibers at a uniform density. Using the sheet molding compound having the sheet (II) of a large thickness, furthermore, the fibers tend to appear on the surfaces at the portions where the reinforcing fibers are contained at high densities, and deteriorate the appearance of the molded products.

According to the fiber-reinforced plastic sheet molding compound of the present invention, the sheet (II) must be stuck to at least one surface of the sheet (I). In particular, when the sheet (II) is stuck to both surfaces of the sheet (I), the fiber-reinforced plastic sheet molding compound exhibits improved handling property and makes it possible to produce molded products having good appearance.

The sheet molding compound of the present invention exhibits good moldability despite its large content of reinforcing fibers as compared with the similar sheet molding compounds which have been developed thus far. When the sheet molding compound of the present invention is molded under the application of heat and pressure to produce the molded products, the reinforcing fibers do not appear on the surfaces of the molded products. The reinforcing fibers are uniformly oriented and are allowed to flow into every corner of the molded products of even complicated shapes. Consequently, the sheet molding compound of the present invention makes it possible to obtain molded products having very increased strength.

The sheet molding compound of the present invention can be effectively used for producing fiber-reinforced plastic molded products of complicated shapes, such as fishing reels, gears, microphone cases, any machine parts, reinforcing members, artificial teeth, dental plates, and the like.

The invention will now be explained below in further detail with reference to working examples.

EXAMPLE 1

A semi-hardened (B-stage) prepreg sheet containing 37.5% by weight of a thermosetting resin was prepared by impregnating a sheet of a carbon fiber which is oriented in one direction with an epoxy resin, and adjusting the thickness of the sheet using a dies followed by the heating. Elongated pieces of a width of 5 mm and a length of 6 mm cut from the prepreg sheet were laminated in a random fashion, and were treated with a press to prepare a sheet member (A) of a thickness of 0.16 mm containing 37.5% by weight of the resin.

On the other hand, the epoxy resin used for preparing the sheet member (A) was formed into a sheet on a parting tape, and was treated with heat to prepare a sheet member (B) composed of a semi-hardened (B-stage) thermosetting resin having a thickness of 0.03 mm.

The sheet member (A) was placed on the sheet member (B), and on which sheet member (A) was further placed the sheet member (B). The thus laminated sheets were adhered with pressure using nip rollers, to prepare a fiber-reinforced composite sheet material I of the present invention. The fiber-reinforced composite sheet material I was charged into a metal mold, and was molded at 130° C. under the pressure of 70 kg/cm² for 1 hour to prepare a molded product. The thus molded product exhibited smooth surfaces. Five test pieces each measuring 2 mm in thickness, 10 mm in width and 100 mm in length, were cut out from the molded product, and were subjected to the bending test using TENSILON, Model UTM-III, manufactured by Toyo Baudwin Co. under the conditions of a span of 80 mm and a cross-head speed of 2 mm per minute. The molded product exhibited properties which were as excellent as 2.5 t/mm² in average bending modulus of elasticity and 20 kg/mm² in bending strength.

Using the sheet member (A) only, on the other hand, a molded product was prepared in the same manner as above. The molded products contained numerous voids in the surfaces, and exhibited poor appearance and varying properties.

Further, a fiber-reinforced composite sheet material (C) was prepared in the same manner as mentioned above but using sheet members of a thickness of 0.17 mm which are composed of the same materials as the sheet members (A) and (B), instead of the sheet member (A) and the sheet member (B), and a molded product was prepared in the same manner as mentioned above. Surfaces of the product flew during the step of molding, and it was impossible to produce a molded product having good appearance. Further, disorderly state took place in the layer of the fiber-reinforced sheet (A), and a lot of difficulty was encountered before obtaining a product having uniform properties.

The fiber-reinforced composite sheet material I of the present invention was introduced into a square metal mold of a depth of 20 mm and a length of 100 mm without having a cover to prepare a box-shaped molded product under the same conditions as mentioned above. A molded product was obtained having rich surface smoothness and suitable rigidity.

EXAMPLE 2

A fiber-reinforced composite sheet material was prepared quite in the same manner as in Example 1 with the exception that a cut carbon fiber was mixed in an amount of 10% by weight with respect to the resin to prepare a sheet member of a thickness of 0.035 mm, and using the thus prepared sheet member in place of the sheet member (B) of Example 1. The sheet material was molded in the same manner as in Example 1. The molded product exhibited excellent surface smoothness and rigidity.

EXAMPLE 3

A prepreg sheet containing 35% by weight of the resin was prepared by using a glass fiber strand (Glasron R 730, a product of Asahi Fiber Glass Co.) in place of the sheet consisting of the oriented carbon fiber. A sheet member was prepared from the thus obtained prepreg sheet. By using the sheet member instead of the sheet member (A), a fiber-reinforced composite sheet material was prepared quite in the same manner as in Example 1. Then, a molded product was obtained in the same manner as in Example 1. The molded product exhibited a bending modulus of elasticity of 1.3 t/mm² and smooth surfaces.

EXAMPLE 4

A mixture consisting of an epoxy resin and 3% by weight of BF₃-MEA was allowed to flow onto a parting paper coated with a silicone resin, to prepare a sheet. On the sheet was then placed a mixture consisting of a carbon fiber of a length of 25 mm and a glass fiber of a length of 25 mm at a ratio of 2 to 1 by weight, and on which was further placed a parting paper. The thus obtained laminate was then repetitively passed through groups of rollers in order to prepare a sheet member (A) having a thickness of 1.2 mm containing 45% by weight of the resin.

Separately, a sheet member (B) consisting of an epoxy resin containing the above-mentioned hardening promoting agent and having a thickness of 0.05 mm, was prepared. By using the sheet members (A) and (B), a fiber-reinforced composite sheet material was prepared in the same manner as in Example 1.

The fiber-reinforced composite sheet member was molded in the same manner as in Example 1 but at a temperature of 170° C., to obtain a molded product which exhibited smooth surfaces.

Furthermore, a fiber-reinforced composite sheet was prepared in the same manner as above but using a sheet member containing 80% by weight of the fiber, instead of using the sheet member (A), and was molded in the same manner as mentioned above. The molded product exhibited rugged surfaces and presented poor appearance.

EXAMPLE 5

A mixture consisting of 75 parts of a diallyl phthalate prepolymer (a softening point 80° C., an iodine value 60), 25 parts of a diallyl phthalate monomer, 1.5 parts by weight of a tertiary butyl perbenzoate, and 1 part by weight of a parting agent, was used as a resin. 10,000 filament tows of the carbon fiber which was impregnated with 33% of the resin and which was spread to a width of 10 mm were cut to a length of 25 mm, arrayed in a random fashion on a plane, and were molded together under the application of pressure to prepare a sheet of a thickness of 0.2 mm. The sheet was then sandwitched between the resin films of a thickness of 0.1 mm via the parting papers which were placed on the upper and lower surfaces of the sheet. The laminate was then compressed by rubber rollers to obtain a fiber-reinforced composite sheet material.

The sheet material was charged into a metal mold and was molded at 150° C. under the pressure of 70 kg/cm² for 10 minutes. The molded product exhibited smooth surfaces. Test pieces of a width of 10 mm and a length of 100 mm were taken out from the molded product having a thickness of 2 mm, and were subjected to the bending test in the same manner as in Example 1. An average bending modulus of elasticity of 2 tons/mm² and a bending strength of 20 kg/mm² were obtained.

EXAMPLE 6

A prepreg consisting of a carbon fiber oriented in one direction and an epoxy resin, having a resin content of 37.5% and a thickness of 0.15 mm, was cut into pieces 10 mm in width and 25 mm in length. The pieces were arrayed in a random fashion between separately prepared films made of the same resin, to prepare a reinforced unhardened plastic material having a resin content of 50%. The unhardened material was supplied in a required amount into a metal mold for producing a spool which is a reel part, and was molded under the pressure of 70 kg/cm² at a hardening temperature of 150° C. for 15 minutes. The molded product exhibited very smooth surfaces faithful to the metal mold. To test the strength of the molded product, a fishing gut No. 5 was fully wound on the spool under the tension of 1 kg weight. The spool was not broken, or was not deformed, either.

Here, the spool was prepared by using the metal mold of the same size as that of the spool (made of aluminum) of a commercially available spinning reel. The weight of the aluminum spool was 70.6 g, while that of the reinforced plastic spool was 40.0 g.

EXAMPLE 7

A prepreg consisting of the carbon fiber oriented in one direction and an unsaturated polyester resin composed of diallyl phthalate prepolymer, diallyl phthalate monomer, tertiary butyl perbenzoate and zinc stearate at a weight ratio of 85/15/3/1, having a resin content of 37.5% and a thickness of 0.15 mm, was cut into pieces of a width of 10 mm and a length of 25 mm. The pieces were arrayed in a random fashion between the separately prepared films made of the same resin to prepare an unhardened reinforced plastic material having a resin content of 50%. The unhardened reinforced plastic material was supplied into a metal mold for preparing a spool, and was molded under the pressure of 70 kg/cm² at 130° C. for 15 minutes to prepare a spool having smooth surfaces. The spool was tested for its strength in the same manner as in Example 6, and there was no problem. The spool also weighed 40 g.

Figure 5:
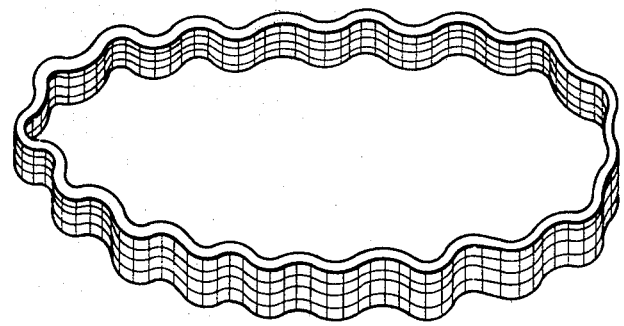
FIG. 5 is a perspective view of an intermediate product in the form of a corrugated draining board which is obtained by using the sheet molding compound of the present invention of a shape shown in FIG. 6.
Figure 6:
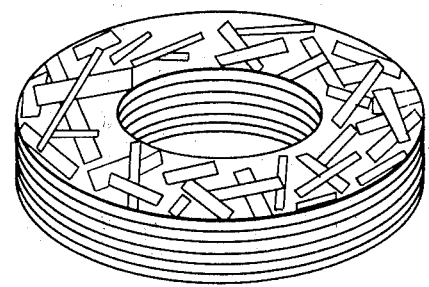
FIG. 6 is a perspective view of a cylindrical product obtained by laminating the sheet molding compound of the present invention in a plurality of layers.
Figure 7:
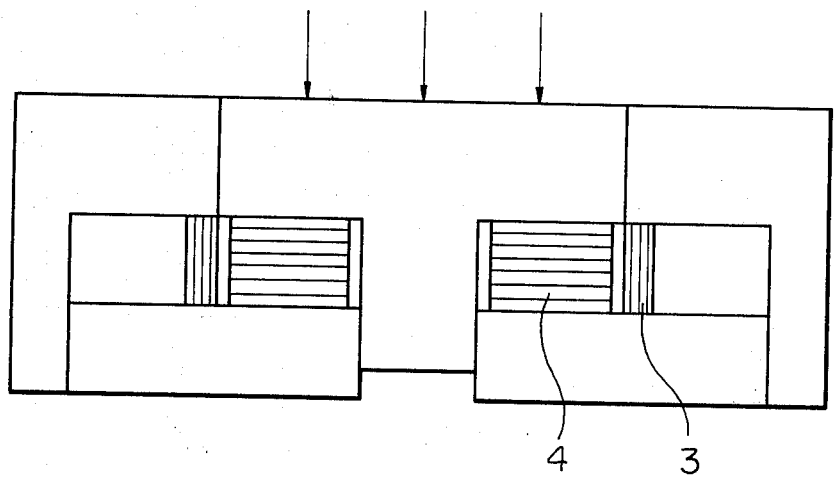
FIG. 7 is a cross-sectional view of a metal mold which is used for making a gear using the sheet molding compound of the present invention.

A prepreg consisting of a satin cloth made of carbon fiber impregnated with an epoxy resin in an amount of 37.5% and having a thickness of 0.45 mm was cut to a width which is equal to the thickness of a spur gear, to form an intermediate product of the form of a corrugated draining board having protruded and recessed portions in a number equal to the number of teeth as shown in FIG. 5. Then, the carbon fiber impregnated with the epoxy resin in an amount of 37.5% was arrayed in a random fashion on the separately prepared unhardened film made of the epoxy resin so that the total amount of the resin was 50%. The thus prepared unhardened plastic sheet member was cut into a disc having a hole, and was laminated as shown in FIG. 6. The laminate was mounted in the intermediate product, introduced into a metal mold heated at 150° C., and was molded under the pressure of 150 kg/cm² or greater exerted from the upper direction as shown in FIG. 7 for 30 minutes to prepare a gear. The molded product exhibited smooth surfaces maintaining sizes equal to that of the metal mold.

What is claimed is:

1. A fiber-reinforced plastic sheet molding compound, comprising:
a first sheet composed of from 30 to 90% by weight of reinforcing fibers and from 70–10% by weight of a matrix resin, said first sheet being formed of remolded rectangular or triangular ribbon shaped chips of a width of at least 1 mm and a length of at least 3 mm, at least one surface of said first sheet being joined with a second sheet composed of the said matrix resin and from 0–30% by weight of reinforcing fibers, said second sheet having a thickness less than that of said first sheet.

2. The sheet molding compound of claim 1, wherein each side of said first sheet is joined to a second sheet.

3. The sheet molding compound of claim 1 or 2, wherein the reinforcing fibers have a length greater than 1 mm.

4. The sheet molding compound of claim 1, wherein said ribbon shaped chips forming said first sheet member have a width of from 1–30 mm and a length of from 5–50 mm.

5. The sheet molding compound of claim 1, 2 or 4, wherein said reinforcing fibers are carbon fibers.

6. The sheet molding compound according to claim 1, 2 or 4, wherein said matrix resin of both sheets is a thermosetting resin.

7. The sheet molding compound of claim 6, wherein said thermosetting resin is a B-stage epoxy resin.

8. The sheet molding compound of claim 6, wherein said thermosetting resin is a diallyl phthalate resin.

9. The sheet molding compound of claim 1, 2, or 4, wherein said matrix resin of both sheets is a hot melt-type thermosetting resin.

* * * * *